(12) United States Patent
de los Reyes et al.

(10) Patent No.: US 7,880,728 B2
(45) Date of Patent: Feb. 1, 2011

(54) APPLICATION SWITCHING VIA A TOUCH SCREEN INTERFACE

(75) Inventors: August de los Reyes, Bellevue, WA (US); Paul E. Henderson, Bellevue, WA (US); Steven McGrath, San Jose, CA (US); Adrian M. Chandley, Sammamish, WA (US); Allen Sayegh, Boston, MA (US); Edith Ackermann, Cambridge, WA (US)

(73) Assignee: Microsoft Corporation, Redmond, WA (US)

( * ) Notice: Subject to any disclaimer, the term of this patent is extended or adjusted under 35 U.S.C. 154(b) by 753 days.

(21) Appl. No.: 11/478,471

(22) Filed: Jun. 29, 2006

(65) Prior Publication Data

US 2008/0001924 A1    Jan. 3, 2008

(51) Int. Cl.
*G06F 3/041* (2006.01)
(52) U.S. Cl. .................................. 345/173; 715/764
(58) Field of Classification Search ......... 345/173–178, 345/619; 715/863, 769, 835
See application file for complete search history.

(56) References Cited

U.S. PATENT DOCUMENTS

| | | | | |
|---|---|---|---|---|
| 5,920,316 A * | 7/1999 | Oran et al. | ............ | 715/779 |
| 6,157,371 A * | 12/2000 | Smeets | ............ | 345/168 |
| 6,266,098 B1 * | 7/2001 | Cove et al. | ............ | 348/563 |
| 6,956,562 B1 | 10/2005 | O'Hara et al. | | |
| 6,980,312 B1 | 12/2005 | Czyszczewski et al. | | |
| 6,993,722 B1 | 1/2006 | Greer et al. | | |
| 2001/0043189 A1 * | 11/2001 | Brisebois et al. | ............ | 345/156 |
| 2003/0106054 A1 * | 6/2003 | Billmaier et al. | ............ | 725/39 |
| 2004/0001073 A1 * | 1/2004 | Chipchase | ............ | 345/619 |
| 2004/0117804 A1 | 6/2004 | Scahill et al. | | |
| 2005/0140661 A1 | 6/2005 | Collins | | |
| 2005/0190144 A1 | 9/2005 | Kong | | |
| 2005/0237310 A1 | 10/2005 | Fabritius et al. | | |
| 2005/0289476 A1 * | 12/2005 | Tokkonen | ............ | 715/769 |
| 2006/0013610 A1 | 1/2006 | Martin et al. | | |
| 2006/0161870 A1 * | 7/2006 | Hotelling et al. | ............ | 715/863 |
| 2006/0242607 A1 * | 10/2006 | Hudson | ............ | 715/863 |
| 2007/0075976 A1 * | 4/2007 | Kun et al. | ............ | 345/172 |
| 2007/0150842 A1 * | 6/2007 | Chaudhri et al. | ............ | 715/863 |

FOREIGN PATENT DOCUMENTS

WO    2005/071530 A1    4/2005

OTHER PUBLICATIONS

"Interfaces for Managing Applications and Input in Multi-Device Environments", Jacob T. Biehl and Brian P. Bailey, May 23-26, 2006, 4 pgs.
"Internet Increases Need for Retail Touch Screens", Ed Hess, Mar. 5, 2001, reprinted from the Internet at: http://web.archive.org/web/20010305012721/http://integratedsolutionsmag.com/articles/2000_7/000710.htm.
1st Kiosk, "K0Builder", Dec. 9, 2002, Reprinted from the Internet at: http://web.archive.org/web/20021209163453/http://www.1srkiosk.com/kbuilder.html.

* cited by examiner

*Primary Examiner*—Amare Mengistu
*Assistant Examiner*—Aaron Midkiff (57) ABSTRACT

Detailed herein is a technology which, among other things, provides a touch screen interface for computer system which allows intuitive switching between several applications. In one approach to this technology, a touch screen display is used to display an interface for an application. A touch sensitive border region is defined at the edge of this display, and is associated with another application. Receiving input at the touch sensitive border region causes the touch screen display to display the interface for the second application.

20 Claims, 6 Drawing Sheets

Flowchart 600

FIG. 6

APPLICATION SWITCHING VIA A TOUCH SCREEN INTERFACE

BACKGROUND

Embodiments pertain to the field of user interfaces for computer systems, and, more particularly, to a graphical user interface (GUI) for a touch screen input computer system.

Computer systems are becoming ever more integral to everyday life. No longer confined to the desktop, computers appear in telephones, televisions, stereo systems, and even refrigerators. It has quickly become apparent, with computers appearing in nontraditional locations, that traditional user interface tools are inadequate. When watching television, a keyboard is not welcome; when visiting the refrigerator, a mouse is a poor tool.

One solution involves using a touch screen, rather than a different type of interface. A touch screen environment allows for a more "friendly" interface; its use is reasonably intuitive, and does not require a technically savvy user. Even a touch screen is not enough, however. Simply duplicating a typical desktop computer interface, but including a touch screen in place of the keyboard and mouse, does not make for ease of use.

SUMMARY

Detailed herein is a technology which, among other things, provides a touch screen interface for computer system which allows intuitive switching between several applications. The interface for a single application is displayed on a touch sensitive display, and a number of border regions surround the interface for the application. These border regions can be used for access to other applications available to the computer system.

In some cases, the application a border region is associated with will change. For example, when a border region appearing on the right edge of the display is used to access an application, a border region on the left edge may be used to return to the previous application, while the border region on the right is now used to access a different application. In this way, a user can cycle through all of the available applications on the computer system by using the same interface elements.

In some cases, data can be passed between applications by using the touchscreen to move a representation of the data from the active application to the border region associated with another application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

The accompanying drawings, which are incorporated in and form a part of this specification, illustrate embodiments and, together with the description, serve to explain the principles of the claimed subject matter:

DETAILED DESCRIPTION

What is described herein, therefore, are embodiments intended to present a simplified and easy to use graphical user interface (GUI), while retaining useful functionality. In some embodiments, for example, the GUI that is presented allows for a single application to fill the entire display region, while still allowing easy access to other, not currently displayed, applications. Further, in some embodiments, data objects can be passed between the displayed application and other applications. The combination of these features allows for system which can readily switch between different running applications, or modes, through intuitive use of a touch screen. Embodiments are well suited to applications in many environments, including, but not limited to, kiosk-style computers or embedding within appliances.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 6) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices, such as computing system environment 10, typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Basic Computing Device

Figure 1:
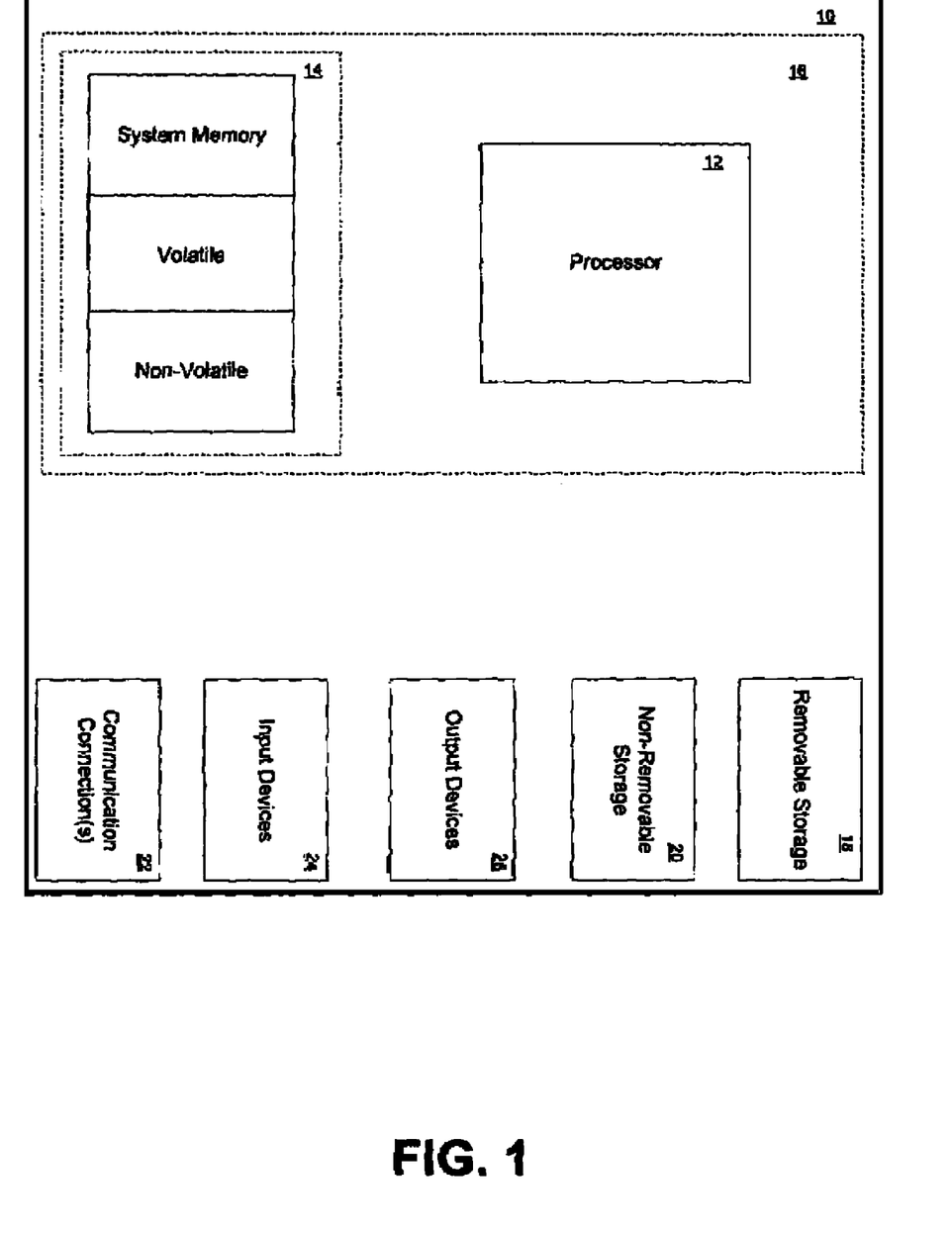
FIG. 1 is a block diagram of an exemplary computing system upon which embodiments may be implemented.

With reference to FIG. 1, an exemplary system for implementing embodiments includes a general purpose computing system environment, such as computing system environment 10. In its most basic configuration, computing system environment 10 typically includes at least one processing unit 12 and memory 14. Depending on the exact configuration and type of computing system environment, memory 14 may be volatile (such as RAM), non-volatile (such as ROM, flash memory, etc.) or some combination of the two. This most basic configuration is illustrated in FIG. 1 by dashed line 16. Additionally, computing system environment 10 may also have additional features/functionality. For example, computing system environment 10 may also include additional storage (removable and/or non-removable) including, but not limited to, magnetic or optical disks or tape. Such additional storage is illustrated in FIG. 1 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and nonremovable storage 20 are all examples of computer storage media.

Computing system environment 10 may also contain communications connection 22 that allow it to communicate with other devices. Communications connection 22 is an example of communication media.

Computing system environment 10 may also have input device(s) 24 such as a keyboard, mouse, pen, voice input device, touch input device, etc. Output device(s) 26 such as a display, speakers, printer, etc. may also be included. Specific embodiments, discussed herein, combine touch input devices with a display, e.g., a touch screen. All these devices are well known in the art and need not be discussed at length here.

Touch Screen Interface

Figure 2:
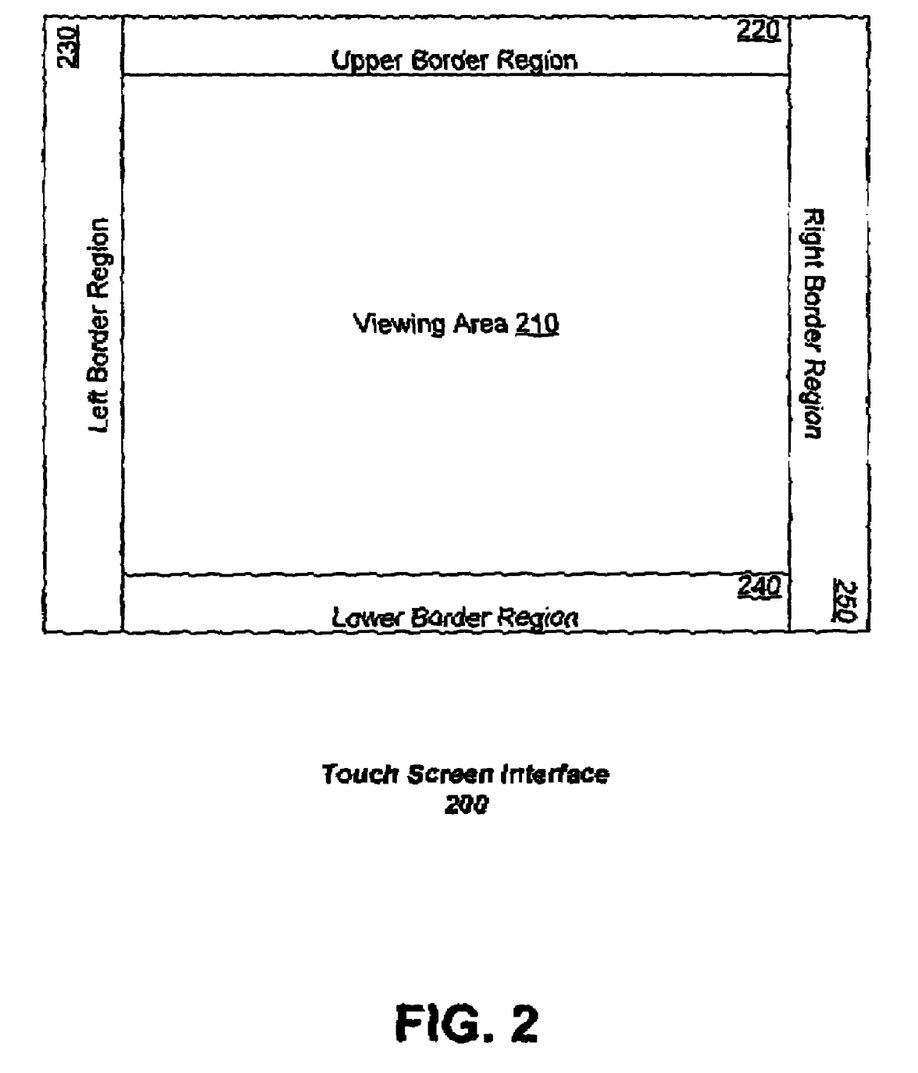
FIG. 2 is a depiction of a touch screen interface, in accordance with one embodiment.

With reference now to FIG. 2, a touch screen interface 200 is depicted, in accordance with one embodiment. While touch screen interface 200 is shown as incorporating specifically enumerated components, it is understood that such depiction is exemplary in nature. In other embodiments, the elements incorporated into touch screen interface 200 will vary. For example, the functionality of several elements may be combined, or the functionality of one element may be spread among several different components, or some combination thereof. In some embodiments, the shape of touch screen interface 200 will vary, according to the underlying computer system upon which touch screen interface 200 is incremented.

Touch screen interface 200, in the depicted embodiment, is intended for use on a computer system optimized for a touch screen interface. In some embodiments, touch screen interface 200 may be the only interface for such a computer system. In other embodiments, additional input devices may be used, e.g., to provide additional functionality not available through touch screen interface 200.

Touch screen interface 200 is shown as including a centralized viewing area 210. As shown, a number of border regions surround viewing area 210. Upper border region 220 appears at the top edge of touch screen interface 200. Left border region 230 appears that the left edge of touch screen interface 200. Lower border region 240 appears at the bottom edge of touch screen interface 200. Right border region 250 appears at the right edge of touch screen interface 200. In some embodiments, these border regions may be further subdivided, e.g., depending upon the number of applications intended to be accessed through touch screen interface 200.

Touch Screen Interface and Access to Applications

Some embodiments, such as touch screen interface 200, are used to access a number of different programs or applications operating on the underlying computer system. Embodiments facilitate this access, by allowing a single application make use of all, or most of, the available viewing area, while still allowing easy access to other applications through use of the touch screen.

Figure 3:
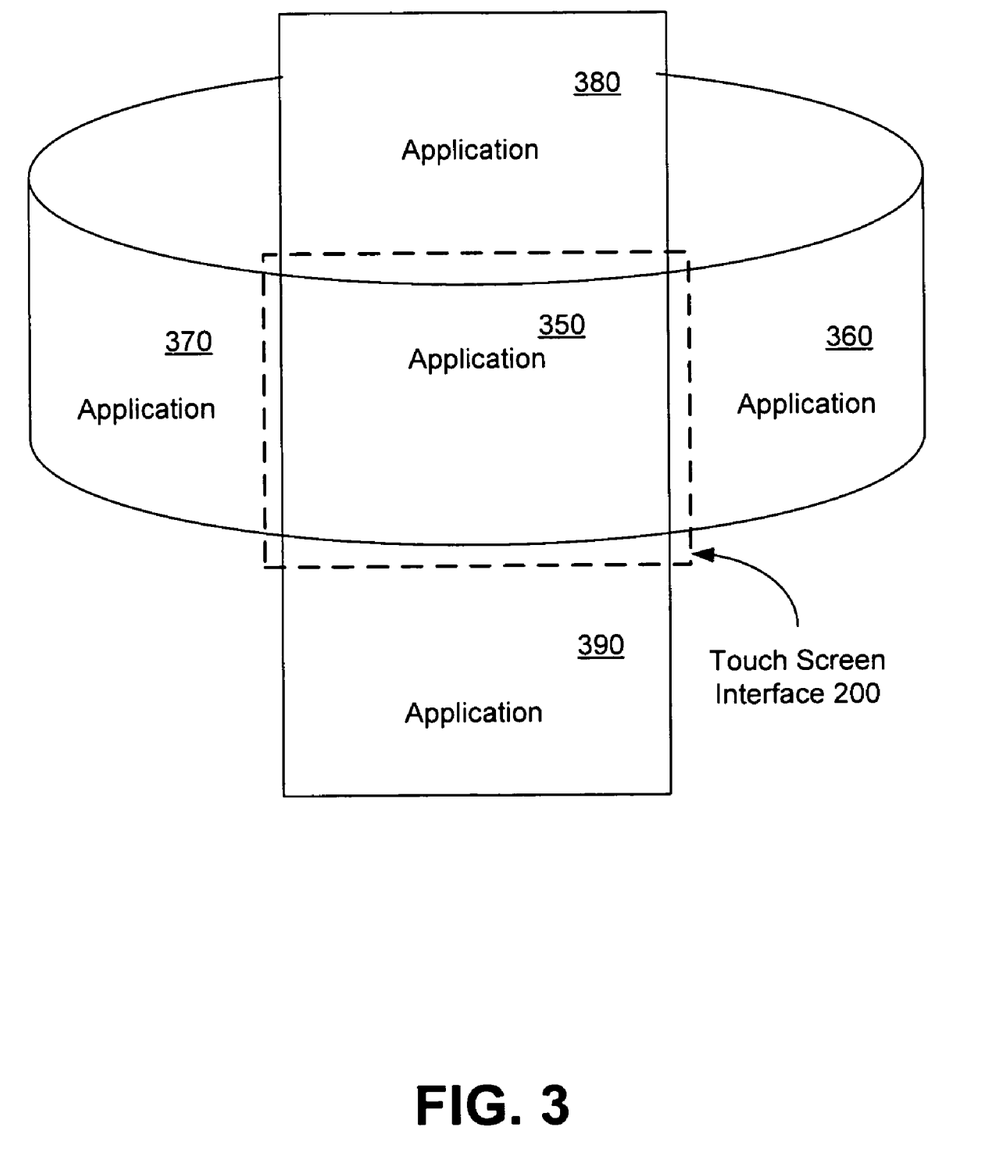
FIG. 3 is a depiction of an exemplary application loop, in accordance with one embodiment.

With reference to FIG. 3, a depiction of an exemplary application loop is presented, in accordance with one embodiment. It is understood that while certain features and elements are enumerated with reference to FIG. 3, FIG. 3 is exemplary in nature. In other embodiments, other elements and features will be incremented.

FIG. 3 illustrates how a touch screen interface, like touch screen interface 200, can be used to navigate between several different applications, through use of the touch screen itself. FIG. 3 shows a touch screen interface 200 superimposed over application 350. In this way, application 350, or rather the interface to application 350, is allowed to make use of the entire viewing area 210.

The border regions of touch screen interface 200, in the depicted embodiment, overlap other applications available to a user of touch screen interface 200. For example, upper border region 220 overlaps with application 380, while left border region 230 overlaps with application 370, and right border region 250 overlaps with application 360. As explained in greater detail below, these border regions can be used to access the other applications, or even to transfer data objects between applications.

In some embodiments, these border regions, while defined to be touch sensitive in particular ways as described below, actually show a portion of the interface of the application they are associated with. For example, left border region 230 may actually depict the far right edge of application 570's interface.

FIG. 3 depicts an embodiment, such that changing which application is centered in viewing area 210, may also change which applications are available through the border regions. For example, if touch screen interface 200 is used to select application 370, such that the interface to application 370 is in viewing area 210, then left border region 230 will now provide access to application 360, while right border region 250 would now be used to access application 350. In effect, the applications "rotate", as if applications 350, 360, and 370 were located on a cylinder.

FIG. 3 shows an embodiment in which ready access to up to five applications is easily achieved. In some embodiments, additional applications can be added, without adding additional border regions, or subdividing the existing border regions. In these embodiments, a user will not have single touch access to every available application; the simplicity of the interface is preserved, but the user may have to cycle through several application interfaces before finding the one sought. In other embodiments, the border regions can be subdivided, e.g., lower right border region 251 and upper right border region 252, preserving the one touch access aspect, but slightly increasing the complexity of the interface. In other embodiments, other variations are used.

Using the Touch Screen Interface

Figure 4:
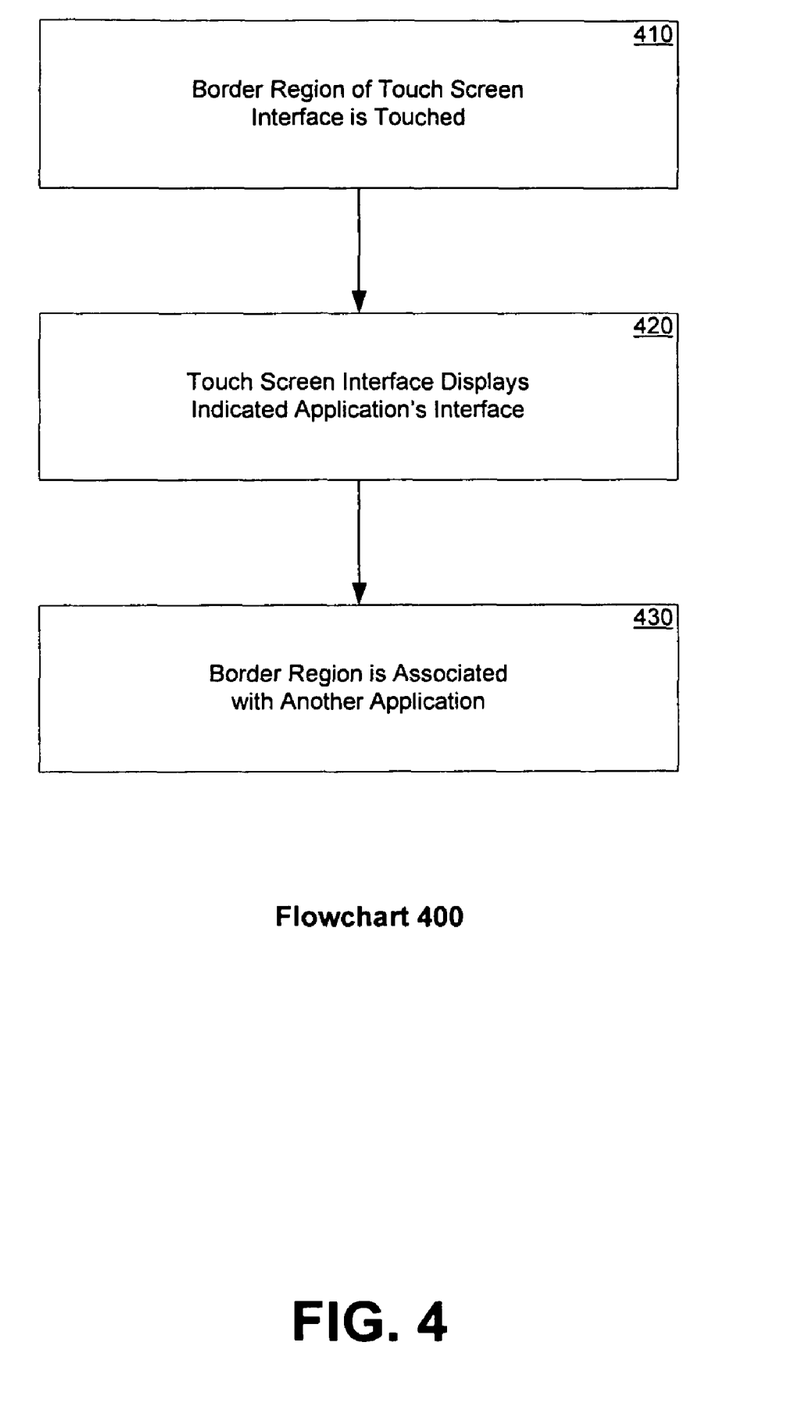
FIG. 4 is a flowchart of the method of using touch screen interface, in accordance with one embodiment.

With reference now to FIG. 4, a flowchart 400 of a method of using a touch screen interface is presented, in accordance with one embodiment. Although specific steps are disclosed in flowchart 400, such steps are exemplary. That is, embodiments are well suited to performing various other (additional) steps or variations of the steps recited in flowchart 400. It is appreciated that the steps in flowchart 400 may be performed in an order different than presented, and that not all of the steps in flowchart 400 may be performed.

With reference now to step 410 and FIGS. 2 and 3, a border region of a touch screen interface is touched. For example, if viewing area 210 is centered on application 350, as shown in FIG. 3, left border region 230 could be touched by a user.

With reference now to step 420 and FIGS. 2 and 3, the touch screen interface displays an interface for an application indicated by that border region. For example, in FIG. 3, left border region 230 is associated with application 370. When the user touches left border region 230, viewing area 210 will instead display the interface for application 370.

The transition between displaying one applications interface and another's is accomplished in different ways, in different embodiments. In some embodiments, for example, the transition is nearly instantaneous; e.g., viewing area 210 goes from displaying the interface for application 350 to the interface for application 370 with no graphical transition. In other embodiments, the transition may involve a sliding or rotational effect; e.g., viewing area 210 displays application 350 sliding to the right, as application 370 slides on from the left, as if the two interfaces were adjacent on a cylinder that is rotating. In other embodiments, different transitions may be used, e.g., any graphical transition used in the video or GUI fields.

With reference now to step 430 and FIGS. 2 and 3, in some embodiments, the border region of the touch screen interface is associated with another application. For example, as shown in FIG. 3, if application 370 is in viewing area 210, then left border region 230 is now associated with application 360. This process will vary in different embodiments. In some embodiments, e.g., an embodiment where applications are presented as if tiles on a flat surface, rather than as if on a cylinder as shown in FIG. 3, shifting to a "left" application may bring the focus of viewing area 210 to the "edge" of the available applications, such that no additional applications are accessible through the left border region. In such embodiments, the left border region may appear inactive in some way, e.g., grayed out, or may disappear entirely.

Embodiments implementing the above described method allow for easy transition between different applications running on the computer system with the touch screen interface. At the same time, however, the interface for single application is allowed to use almost all of the available viewing area of the touch screen display, which allows for a richer presentation than might otherwise be possible.

Manipulating Data Objects

In some embodiments, a touch screen interface, such as the one described above, can also be used to manipulate data objects, e.g., passing data between applications. In several embodiments, two or more of the applications running on the underlying computer system may be able to manipulate the same data object, but perhaps in different ways. For example, an e-mail program running on this interface may be able to send and receive a digital photograph, while a photo editing program also running on this interface may be able to manipulate such a photograph. In such a case, it is useful for the touch screen interface to allow the data to be moved between the two programs.

Figure 5A:
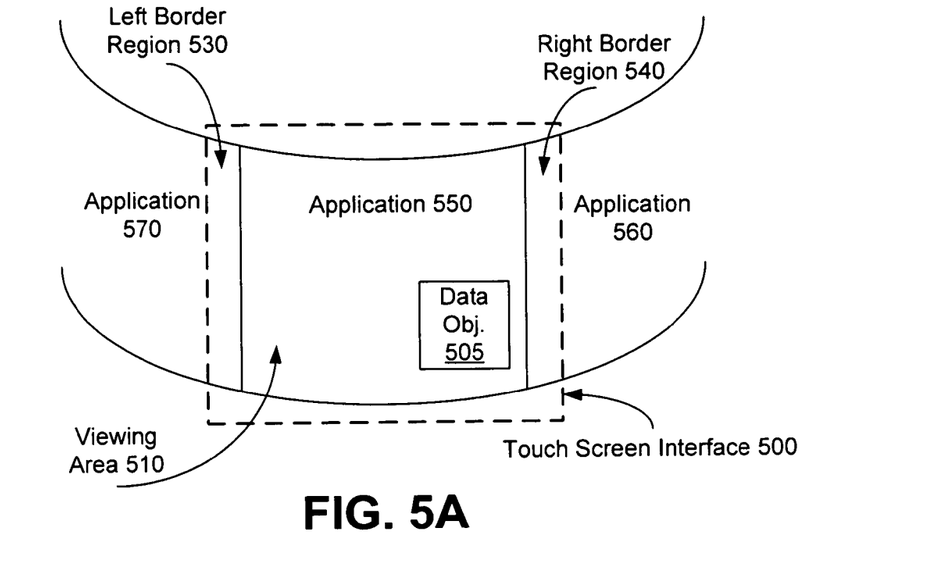
FIG. 5A is a depiction of a touch screen interface displaying a representation of a data object, in accordance with one embodiment.
Figure 5B:
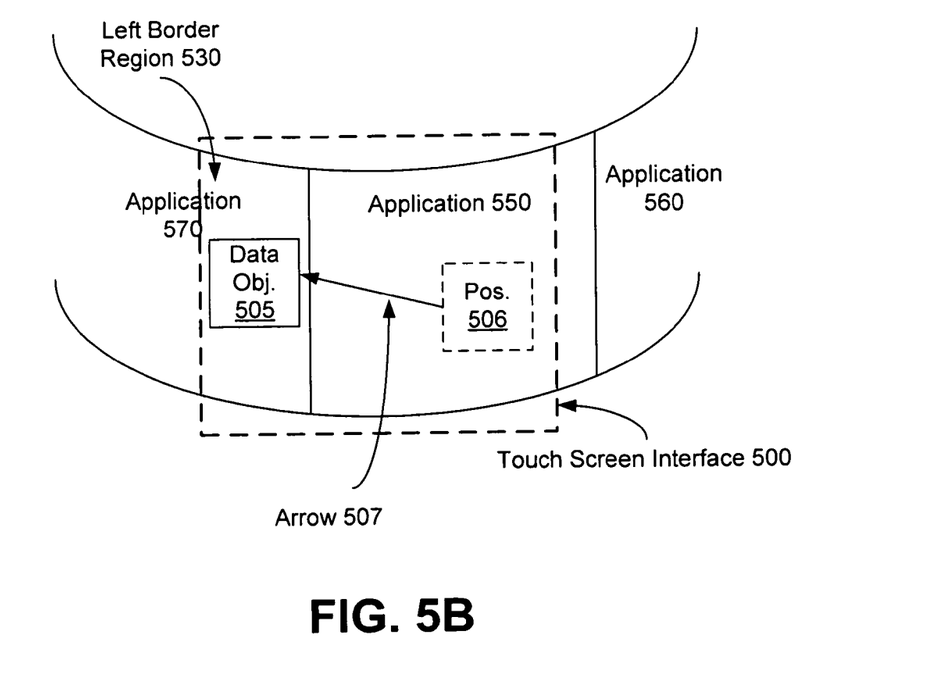
FIG. 5B is a depiction of a touch screen interface displaying a representation of a data object that has been moved, in accordance with one embodiment.

With reference now to FIGS. 5A and 5B, a touch screen interface 500 is depicted, in accordance with one embodiment. While touch screen interface 500 is shown as incorporating specifically enumerated components, it is understood that such depiction is exemplary in nature. In other embodiments, the elements incorporated into touch screen interface 500 will vary. For example, the functionality of several elements may be combined, or the functionality of one element may be spread among several different components, or some combination thereof. In some embodiments, the shape of touch screen interface 500 will vary, according to the underlying computer system upon which touch screen interface 500 is incremented.

Touch screen interface 500 is shown as including a left border region 530, and a right border region 540. Touch screen interface 500 also has viewable area 510. Left border region 530, in the depicted embodiment, is associated with application 570. Right border region 540 is associated with application 560.

In FIG. 5A, viewable area 510 shows the interface for application 550. Within application 550, is data object 505.

Data object 505, in the depicted embodiment, is a representation of some computer data or file, e.g., data object 505 is an image of a photograph, where the photograph itself is stored as data within the underlying computer system.

In FIG. 5B, data object 535 is shown as having moved from its previous position 506 along the path indicated by arrow 507. FIG. 5B also shows left border region 530 as having expanded to allow data object 505 to place completely within the border region.

Method of Transferring Data Between Applications

Figure 6:
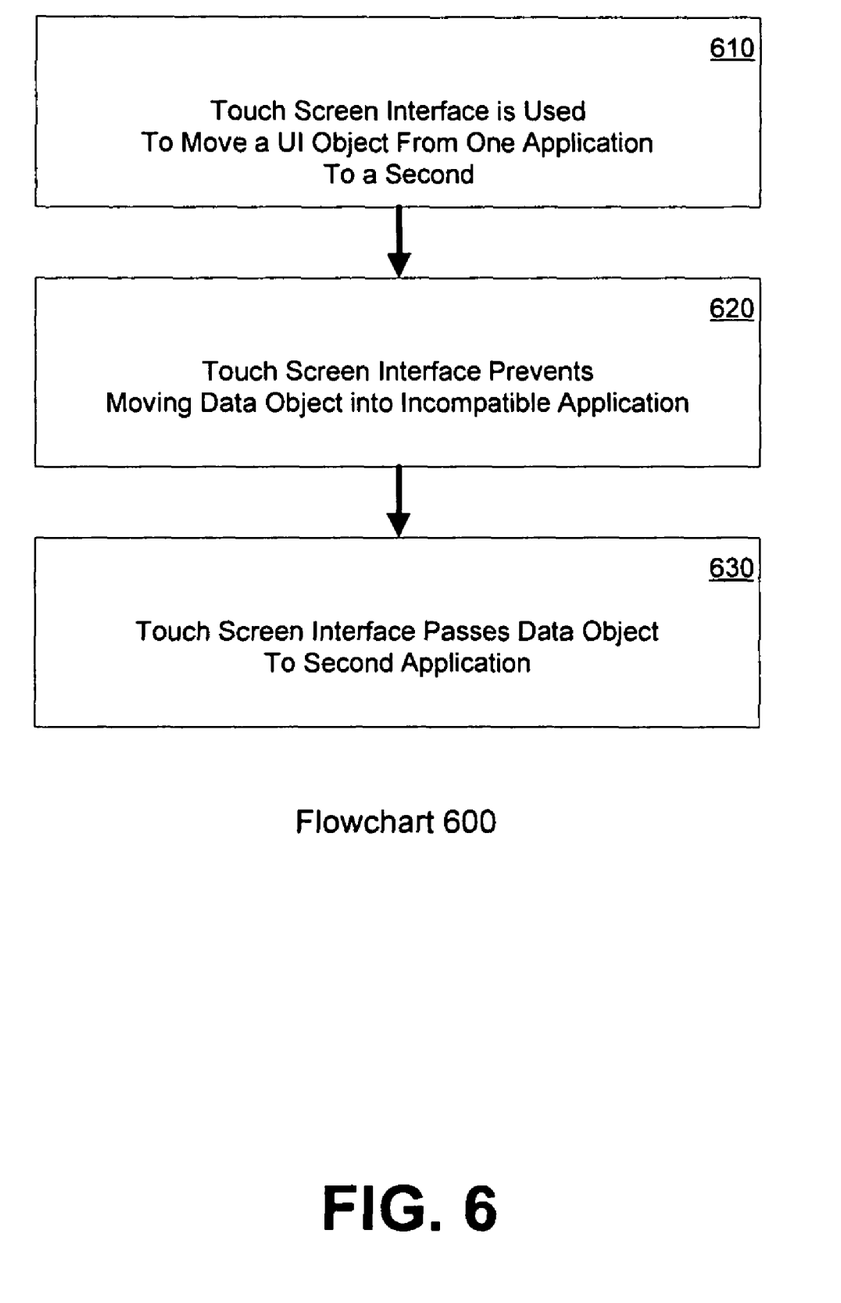
FIG. 6 is a flowchart of a method of transferring data between applications, in accordance with one embodiment.

With reference now to FIG. 6, a flowchart 600 of a method of transferring data with between applications is depicted, in accordance with one embodiment. Although specific steps are disclosed in flowchart 600, such steps are exemplary. That is, embodiments are well suited to performing various other (additional) steps or variations of the steps recited in flowchart 600. It is appreciated that the steps in flowchart 600 may be performed in an order different than presented, and that not all of the steps in flowchart 600 may be performed.

With reference now to step 610 and FIGS. 5A and 5B, a touch screen interface is used to move a user interface object from a first application's interface to a border region associated with a second application. For example, a user could drag data object 505 from its position in application 550, e.g., position 506, to the left border region 530, which is associated with application 570.

With reference now to step 620, the touch screen interface will prevent the user interface object's movement, if the second application doesn't support that type of object. In some embodiments, the user is informed that the second application does not support the data object in different ways. Many approaches to this problem are possible, including, but not limited to, audio cues, grayed out border regions, or red exes overlaid on the data object. For example, if a user attempts to drag a photograph file from a photo editing application to an audio playback program, the user interface may gray out the border region when the data object is dragged there. Other embodiments omit this step.

With reference now to step 630, the touch screen interface passes the data object to the second application. In some embodiments, this process is similar to a traditional "move" operation, where the data is copied to the new application, and removed from the old application. In other embodiments, this process is performed as an "copy" operation, and both the old application and the new application have access to the data object. In other embodiments, other approaches are utilized.

In some embodiments, this action is accompanied by a graphical transition, with a representation of the data object being manipulated within the viewing area of the interface. In different embodiments, this is accomplished in different ways. In one embodiment, the interface may increase the size of the border region, to allow the data object to be placed entirely within the border region. In other embodiments, a data object is handed to the second application, without a graphical transition. For example, with reference to FIG. 5B, when data object 505 is dragged to left border region 530, the size of left border region 530 is increased, to allow data object 505 to be "dropped" within the interface to application 570.

In some embodiments, after the graphical transition of the movement of the data object is complete, the touch screen interface returns to its previous state. For example, after data object 505 has been moved to application 570, touch screen interface 500 centers again on the interface for application 550. In other embodiments, the focus of the touch screen interface follows the data object being manipulated. For example, when data object 505 is moved to application 570, touch screen interface 500 centers now on the interface for application 570. Some embodiments may incorporate both of these options, e.g., depending on the type of data object being manipulated, or upon a configurable setting, or upon the nature of the user interaction. This last example is explained more fully below, as regards gesturing.

Embodiments that implement the above described method provide a simple, easy to understand representation of moving data or files between applications. The applications themselves are available through the borders of the interface; it is intuitive that data should be about passed between the applications using the same interface mechanism.

Gesturing

In some embodiments, the touch screen interface supports gestures. In these embodiments, a user may interact with the touch screen interface by touching it in a pattern, in order to accomplish a particular result. For example, with reference to FIG. 5B, if the user were to slowly drag data object 505 from position 506 along arrow 507, touch screen interface 500 might respond by following data object 505, and therefore changing the focus of the interface to application 570. By way of contrast, if a user were to quickly move data object 505 along the path of arrow 507, touch screen interface 500 could respond by allowing data object 505 to be dropped into application 570, before returning focus to application 550. Many possible functions and interactions with a touch screen interface are available through this concept of gesturing; the preceding example is intended to be illustrative only.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Embodiments that implement gesture recognition allow for more complexity within the touch screen interface, as a greater number of activities can be performed through use of the touch screen itself.

What is claimed is:

1. A computer system, comprising:
 a touchscreen display configured to:
    display a central viewing area configured to execute a current application comprising a data object;
    display a first selectable border region for use in accessing a first application different than the current application;
    upon receiving user touch input to the touchscreen display to move the data object into the first application of the first selectable border region, execute the data object within the first application as the current application within the central viewing area; and
    in response to executing the data object within the first application as the current application within the central viewing area, associate a new application different than the first application with the first selectable border region.

2. The computer system of claim 1, the touchscreen display configured to:
    in response to associating the new application with the first selectable border region, associate a second new application with a second selectable border region.

3. The computer system of claim 1, the touchscreen display configured to:
    upon receiving user touch input to move the data object into the first application of the first selectable border region, concurrently execute the data object within the first application as the current application within the central viewing area, and associate the new application different than the first application with the first selectable border region, and associate a second new application with a second selectable border region.

4. The computer system of claim 1, the touchscreen display configured to:
upon receiving user touch input to move the data object into the first application of the first selectable border region, concurrently execute the data object within the first application as the current application within the central viewing area and associate the new application different than the first application with the first selectable border region.

5. The computer system of claim 1, the touchscreen display configured to:
display a second selectable border region for use in accessing a second application.

6. The computer system of claim 5, the touchscreen display configured to:
upon receiving user touch input within the second selectable border region, execute the second application as the current application within the central viewing area.

7. The computer system of claim 6, the touchscreen display configured to:
associate an application different than the second application with the second selectable border region, upon executing the second application as the current application.

8. The computer system of claim 5, the touchscreen display configured to:
upon receiving user touch input within the second selectable border region, executing the second application within the second selectable border region.

9. The computer system of claim 1, the touchscreen display configured to:
display the first selectable border region at a left edge adjacent to the central viewing area;
display a second selectable border region, for use in accessing a second application, at a right edge adjacent to the central viewing area;
display a third selectable border region, for use in accessing a third application, at an upper edge adjacent to the central viewing area; and
display a fourth selectable border region, for use in accessing a fourth application, at a bottom edge adjacent to the central viewing area.

10. The computer system of claim 2, the second new application different than the first application and the new application.

11. The computer system of claim 1, the touch screen display configured to:
cycle through a plurality of applications to associate with the first selectable border region based upon repeated user touch input to the first selectable border region.

12. The computer system of claim 11, the touch screen display configured to:
concurrently execute the data object within the current application while executing the data object within the first application.

13. The computer system of claim 1, the touch screen display configured to:
execute a current application different than the first application within the central viewing area; and
execute the first application executing the data object within an expanded view of the first selectable border region.

14. The computer system of claim 1, the touch screen display configured to:
display a graphical transition of the data object moving from the current application to the first application for execution.

15. A method of using a touchscreen display, comprising:
displaying a central viewing area of a current application executing, the current application comprising a data object;
displaying a first selectable border region for use in accessing a first application, different than the current application;
upon receiving user touch input to the touchscreen display to move the data object into the first application of the first selectable border region, executing the data object within the first application as the current application within the central viewing area; and
in response to executing the data object within the first application as the current application within the central viewing area, associating a new application different than the first application with the first selectable border region.

16. The method of claim 15, comprising:
in response to associating the new application with the first selectable border region, associating a second new application with a second selectable border region.

17. The method of claim 15, comprising:
upon receiving user touch input to move the data object into the first application of the first selectable border region, concurrently executing the data object within the first application as the current application within the central viewing area and associating the new application different than the first application with the first selectable border region.

18. The method of claim 15, comprising:
displaying a second selectable border region for use in accessing a second application.

19. The method of claim 18, comprising:
upon receiving user touch input within the second selectable border region, executing the second application as the current application within the central viewing area; and
displaying an application different than the second application within the second selectable border region.

20. A computer system, comprising:
a touchscreen display configured to:
display a central viewing area configured to execute a current application comprising a data object;
display a first selectable border region for use in accessing a first application different than the current application;
upon receiving user touch input to the touchscreen display to move the data object into the first application of the first selectable border region, automatically execute the data object within the first application within the central viewing area; and
associate a new application different than the first application with the first selectable border region on the fly in response to executing the data object within the first application within the central viewing area.

* * * * *